(12) United States Patent
Feuerstraeter

(10) Patent No.: US 6,169,729 B1
(45) Date of Patent: *Jan. 2, 2001

(54) 200 MBPS PHY/MAC APPARATUS AND METHOD

(75) Inventor: Mark T. Feuerstraeter, Rancho Cordova, CA (US)

(73) Assignee: Level One Communications, Inc., Sacramento, CA (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/833,661

(22) Filed: Apr. 8, 1997

(51) Int. Cl.[7] .................................................... H04L 5/16

(52) U.S. Cl. ............................................ 370/296; 370/352

(58) Field of Search .................................... 370/231, 235, 370/250, 445, 448, 279, 296, 276, 278, 213, 446, 352

(56) References Cited

U.S. PATENT DOCUMENTS

| | | | |
|---|---|---|---|
| 5,610,903 | * 3/1997 | Crayford | 370/213 |
| 5,784,559 | * 7/1998 | Frazier et al. | 395/200.13 |
| 5,825,755 | * 10/1998 | Thompson et al. | 370/296 |

OTHER PUBLICATIONS

H.W. Johnson, "Fast Ethernet. Dawn of a New Network," 1966, Prentice Hall PTR, USA., pp. 41–52 and 115–125.
A. Chiang: "Two–Pair Category 3 UTP transceivers for Fast Ethernet," SPIE Emerging High–Speed Local–Area Networks and Wide–Area Networks, Oct. 1995, PA, USA vol. 2608, pp. 20–28.
Copy of International Search Report cited in corresponding PCT application No. PCT/US98/07275.

* cited by examiner

Primary Examiner—Valencia Martin-Wallace
Assistant Examiner—Kim T. Nguyen
(74) Attorney, Agent, or Firm—Merchant & Gould P.C.

(57) ABSTRACT

A 200 Mbps PHY/MAC combination for providing full duplex operation at 400 Mbps is disclosed. The PHY/MAC uses all 4 pairs of wire to create a single channel. A transmit and receive port of a physical layer device is connected to a first end of four pairs of category 5 wiring. A media access control entity sources PLS primitives to manage the flow of frames eight bits a nibble to and from the four pairs of category 5 wiring through the physical layer device. A switch is provided for trunking the four pair of category 5 wiring into a single channel comprising separate 200 Mbps throughput transmit and receive data paths to the physical layer device or into two channels comprising separate 100 Mbps throughput transmit and receive data paths to the physical layer device comprising separate 100 Mbps throughput transmit and receive data paths to the physical layer device. The medium independent interface includes means for providing an eight bit wide transmit data path from the media access control entity to the T2 physical layer device, means for providing an eight bit wide receive data path from the physical layer device to the media access control entity and means for mapping PLS primitives from the media access control entity to the eight bit wide transmit and receive data paths. The eight bit wide transmit and receive data paths of the media independent interface are clocked at 25 MHz, thereby each providing a 200 Mbps data path between the medium access control layer and the physical layer device.

8 Claims, 7 Drawing Sheets

FIG. 6

| Bit(s) | Name | Description | R/W |
|---|---|---|---|
| 15 | Next Page — 604 | 0: LAST PAGE — 606<br>1: ADDITIONAL NEXT PAGE(S) | R/W |
| 14 | Reserved — 614 | Write as 0, ignore on read — 616 | RO |
| 13 | Message Page — 624 | 0: UNFORMATTED — 626<br>1: MESSAGE | R/W |
| 12 | Acknowledge 2 — 634 | 0: CANNOT COMPLY — 636<br>1: CAN COMPLY | R/W |
| 11 | Toggle — 644 | 0: LAST VALUE WAS 1 — 646<br>1: LAST VALUE WAS 0 | RO |
| 10–0 | Message/Unformatted Field — 654 | | R/W |

600

200 MBPS PHY/MAC APPARATUS AND METHOD

BACKGROUND OF THE INVENTION

1. Field of the Invention

This invention relates in general to computer network communication devices, and more particularly to a 200 Mbps PHY/MAC combination for providing full duplex operation at 400 Mbps.

2. Description of Related Art

Today's networks are performance hungry. The explosion of network technology has resulted in more users, applications, and intensive use of networks. Even such traditional applications as word processing have grown in their demand for network bandwidth. Networks are being challenged to provide the highest possible throughput in the most cost effective manner regardless of whether users are loading an application, printing a file, or carrying on an interactive video conference.

The search for network performance has led to the development of a number of advanced technologies. Furthermore, the vast number of technologies being developed suggests that the problem of network performance is substantial. The latest technologies include Asynchronous Transfer Mode (ATM), Fast Ethernet (or 100 Megabit Ethernet), and Fiber Distributed Data Interface (FDDI). Each of these technologies is receiving a good deal of attention from those who need more network performance. More sophisticated protocols are being established to meet this increased demand and are utilizing existing twisted pair wires in office buildings so that many users have access to shared resources at minimal expense.

As will be appreciated by those skilled in the art, communication networks and their operations can be described according to the Open Systems Interconnection (OSI) model which includes seven layers including an application, presentation, session, transport, network, link, and physical layer. The OSI model was developed by the International Organization for Standardization (ISO) and is described in "The Basics Book of OSI and Network Management" by Motorola Codex from Addison-Wesley Publishing Company, Inc., 1993 (First Printing September 1992), and which is incorporated by reference herein.

Each layer of the OSI model performs a specific data communications task, a service to and for the layer that precedes it (e.g., the network layer provides a service for the transport layer). The process can be likened to placing a letter in a series of envelopes before it is sent through the postal system. Each succeeding envelope adds another layer of processing or overhead information necessary to process the transaction. Together, all the envelopes help make sure the letter gets to the right address and that the message received is identical to the message sent. Once the entire package is received at its destination, the envelopes are opened one by one until the letter itself emerges exactly as written.

In a data communication transaction, however, each end user is unaware of the envelopes, which perform their functions transparently. For example, an automatic bank teller transaction can be tracked through the multi-layer OSI system. One multiple layer system (Open System A) provides an application layer that is an interface to a person attempting a transaction, while the other multiple layer system (Open System B) provides an application layer that interfaces with applications software in a bank's host computer. The corresponding layers in Open Systems A and B are called peer layers and communicate through peer protocols. These peer protocols provide communication support for a user's application, performing transaction related tasks such as debiting an account, dispensing currency, or crediting an account.

Actual data flow between the two open systems (Open System A and Open System B), however, is from top to bottom in one open system (Open System A, the source), across the communications line, and then from bottom to top in the other open system (Open System B, the destination). Each time that user application data passes downward from one layer to the next layer in the same system more processing information is added. When that information is removed and processed by the peer layer in the other system, it causes various tasks (error correction, flow control, etc.) to be performed.

The ISO has specifically defined all seven layers, which are summarized below in the order in which the data actually flows as they leave the source:

Layer 7, the application layer, provides for a user application (such as getting money from an automatic bank teller machine) to interface with the OSI application layer. That OSI application layer has a corresponding peer layer in the other open system, the bank's host computer.

Layer 6, the presentation layer, makes sure the user information (a request for $50 in cash to be debited from your checking account) is in a format (i.e., syntax or sequence of ones and zeros) the destination open system can understand.

Layer 5, the session layer, provides synchronization control of data between the open systems (i.e., makes sure the bit configurations that pass through layer 5 at the source are the same as those that pass through layer 5 at the destination).

Layer 4, the transport layer, ensures that an end-to-end connection has been established between the two open systems and is often reliable (i.e., layer 4 at the destination confirms the request for a connection, so to speak, that it has received from layer 4 at the source).

Layer 3, the network layer, provides routing and relaying of data through the network (among other things, at layer 3 on the outbound side an address gets placed on the envelope which is then read by layer 3 at the destination).

Layer 2, the data link layer, includes flow control of data as messages pass down through this layer in one open system and up through the peer layer in the other open system.

Layer 1, the physical interface layer, includes the ways in which data communications equipment is connected mechanically and electrically, and the means by which the data moves across those physical connections from layer 1 at the source to layer 1 at the destination.

The primary standard for Local and Metropolitan Area Network technologies is governed by IEEE Std. 802, which is incorporated by reference herein. IEEE Std. 802 describes the relationship among the family of 802 standards and their relationship to the ISO OSI Basic Reference Model. Generally, IEEE Std. 802 prescribes the functional, electrical and mechanical protocols, and the physical and data link layers for Local and Metropolitan Area Networks (LAN/MAN). The specification augments network principles, conforming to the ISO seven-layer model for OSI, commonly referred to as "Ethernet". In the hierarchy of the seven-layer model, the lowest layers, the so-called physical and data link layers, comprise functional modules that specify the physical transmission media and the way network nodes interface to it, the mechanics of transmitting information over the media in an error-free manner, and the format the information must take in order to be transmitted.

While there are several LAN technologies in use today, Ethernet is by far the most popular. The Ethernet standards include protocols for a 10 Mbps baseband transmissions typically referred to as 10Base-X. Computers equipped with a 10Base-X Ethernet interface attachments may link to other computers over an Ethernet LAN. These Ethernet LAN's provide fast and reliable data transmission networks. Nevertheless, the need for faster data transmission has led to the development of faster standards. One such standard includes the Fast Ethernet standards typically referred to as 100Base-X. The 100Base-X standards generally follow the 10Base-X standards except that the baseband data transmission rate increases from 10 Mbps to 100 Mbps. The 100Base-X standard, however, retains the original CSMA/CD medium access control mechanism.

The 100Base-X standards include the 100Base-T standard for interconnecting devices over an ordinary twisted pair telephone cable. The 100Base-T standard is popular for providing an inexpensive LAN in many modern offices.

The 100Base-X Fast Ethernet standards also include mechanisms for auto-negotiation of the media speed. As the 100 Mbps standard becomes more widely adopted, computers are being equipped with Ethernet interfaces that operate at both 10 Mbps and 100 Mbps. The auto-negotiation function is an optional part of the Ethernet standard that allows the devices to exchange information about their abilities. This, in turn, allows the devices to perform automatic configuration to select a common communication mode over the link. Generally, auto-negotiation provides automatic speed matching for multi-speed devices on a LAN. Multi-speed Ethernet interfaces can then take advantage of the highest speed offered on the LAN.

During the speed setup phase, auto-negotiation exchanges information about devices on the communication link. This information is exchanged via link pulses at 10 Mbps. Devices capable of communicating at 100 Mbps may advertise their ability by sending a packet of data at 10 Mbps typically referred to as fast link pulses. Where all devices on the communication link advertise this ability, the link will be established at 100 Mbps using a 100Base-X protocol.

Currently, auto-negotiation is performed within the physical device layer (PHY). However, new Next Page features require external intervention from a management agent. Auto-negotiation has the option to send additional pieces of information after the "base" negotiation, which determines the network connection, before enabling the data service. This is known as the Next Page function.

Among other things, the Next Page function may be used to send information that corresponds to a unique identifier so that extra features could be implemented on a proprietary basis, yet not conflict with standard operation. Both ends of a twisted-pair link must have auto-negotiation with support for the Next Page function in order to take advantage of this feature.

Generally, if the Next Page bit is set in both the outgoing and incoming Link Code Words, then both the Local Device and the Link Partner are able to support the Next Page function and will participate in Next Page exchange. Once the first Link Code Word has been exchanged, both sides have the information required to configure the highest common technology. However, if Next Page exchange occurs then auto-negotiation does not configure the highest common technology until Next Page exchange has completed.

While no management intervention is required for automatic connection, a management interface is needed to give optional control and status of auto-negotiation. Thus, a management interface may determine why a connection was refused, determine which abilities exist on the network, change connection speed, retrieve fault status and exchange arbitrary configuration information with a Link Partner (in conjunction with the Next Page function). Accordingly, a management entity must be provided to support the Next Page function. A management port in the Media Independent Interface is provided for this function.

Currently, the IEEE and ISO are working on standards for many forms of transmission media. For example, the IEEE 802.3 task force is moving forward on an IEEE 802.3 100Base-T2 transceiver specification, which will be able to handle two-pair category 3, 4 and 5 unshielded twisted pair (UTP) wiring at Full Duplex as well as shielded twisted pair at 100 Mbps. Accordingly, T2 requires Next Page exchanges.

Ethernet's original design was based on a bus topology. In a bus topology, all users have access to a single network cable at their own discretion, rather than being granted access (or being passed "token"). With Ethernet, this access is arbitrated through a mechanism called CSMA/CD, or Carrier Sense Multiple Access/Collision Detection. This ensures that only one network node on the Ethernet bus is transmitting data at any one time. All nodes can receive simultaneously, but only one can transmit. For this reason, any node that wants to transmit data must first listen to the cable. If the cable is not in use, it can then send its data. If the cable is busy, the node must wait a few moments, then begin the cycle again. In practice, this causes only small delays. Greater access delays occur when the cable appears to be available and two nodes both try to transmit at the same time. This results in an event called a collision. Collisions are normal in the CSMA/CD mechanism but do cause transmission delays, especially in networks with many active nodes.

With the addition of an Ethernet switch, an existing network is dynamically divided into multiple parallel networks. The result is a multiplicative effect on throughput. Using an Ethernet switch can increase the maximum theoretical network throughput.

Switched Ethernet can reduce or completely eliminate collisions, depending on the implementation design. An Ethernet switch consists of multiple "ports." Into each port can be plugged a workstation, a network server, or an entire Ethernet segment. Every device that is plugged into the switch has access to every other device on the switch, with, for example, a collision-free full 10 or 100 Mbps connection. When the switch detects a transmission on one of its ports, it creates a physical connection between the sending port and the destination port. For the brief time that the data is flowing from the sender to the receiver, this connection is completely private. No other stations are on the same private "cable," hence there is no possibility of collision.

As Ethernet has evolved, the physical media has metamorphosed from the original thick coax to thin coax, 10Base-T, and fiber optic cable types. With changes in the media have come opportunities to take advantage of the unique features of the cable.

When Ethernet relied on coax cable, all traffic traveled on the same two wires. This meant that the CSMA/CD mechanism was critical to preserving order on the cable. With the introduction of 10Base-T and fiber-optic cabling, the channels for sending and receiving were separated. The collision-detection model was retained because all of the network nodes were still wired together with hubs in a logical bus topology.

When a switch is added to the network, collisions between nodes or subnets are eliminated. When the collision-elimination attribute of the switch is combined with the send/receive channel separation of 10Base-T, a new transmission mode is possible to send and receive simultaneously. Collision detection remains important, however, for any stations that are connected to a hub because they do not have the collision protection afforded by the switch.

Full Duplex increases Ethernet's throughput by creating two collision-free 10-Mbps paths (one for sending and one for receiving) between two Ethernet stations on a single UTP segment. It is simply switched Ethernet with the collision-detection feature removed. By allowing a network node to simultaneously send and receive data, Full Duplex Ethernet doubles the theoretical bandwidth of switched Ethernet from 10 Mbps to 20 Mbps or from 100 Mbps to 200 Mbps.

Currently T2 allows all 4 pairs of wire to be used. However, according to the standard, the 4 pairs must be used to provide two different channels. This requires two different Physical layer devices (PHYs) and 2 different Media Access Control entities (MACs).

It can be seen then that there is a need to create a PHY/MAC which uses all 4 pairs of wire.

It can also be seen then that there is a need for a PHY/MAC that combines all four pair of wires into a single channel to provide 400 Mbps full-duplex operation.

SUMMARY OF THE INVENTION

To overcome the limitations in the prior art described above, and to overcome other limitations that will become apparent upon reading and understanding the present specification, the present invention discloses a 200 Mbps PHY/MAC combination for providing full duplex operation at 400 Mbps.

The present invention solves the above-described problems by providing a PHY/MAC which uses all 4 pairs of wire to create a single channel providing 400 Mbps full-duplex operation.

A system in accordance with the principles of the present invention includes a T2 physical layer device providing a transmit and receive port connected to a first end of four pairs of category 5 wiring, a media access control entity for sourcing PLS primitives to manage the flow of frames eight bits a nibble to and from the four pairs of category 5 wiring, a medium independent interface and a switch.

The switch has a port for accepting the four pairs of category 5 wiring, and the port has a selection capability for trunking the four pair of category 5 wiring into a single channel comprising separate 200 Mbps throughput transmit and receive data paths to the physical layer device or into two channels comprising separate 100 Mbps throughput transmit and receive data paths to the physical layer device.

One aspect of the present invention is that the medium independent interface includes means for providing an eight bit wide transmit data path from the media access control entity to the T2 physical layer device, means for providing an eight bit wide receive data path from the physical layer device to the media access control entity and means for mapping PLS primitives from the media access control entity to the eight bit wide transmit and receive data paths.

Another aspect of the present invention is that the eight bit wide transmit and receive data paths of the media independent interface are clocked at 25 MHz, each providing a 200 Mbps data path between the medium access control layer and the physical layer device.

Another aspect of the present invention is that the medium access control entity further includes means for encapsulating transmit data into frames and passing the frames to the media independent interface and means for filtering data received from the media independent interface and decapsulating the receive data addressed to the media access control entity.

Another aspect of the present invention is that the physical layer device further comprises transmit data means for receiving data from the media access control entity according to an eight bit nibble at 25 MHz, data encoding means for converting transmit data to electrical signals for transmission over the four pair of category 5 wiring according to a first mode or a second mode, data decoding means for converting electrical signals received over the four pair of category 5 wiring to received data according to a first mode or a second mode, processing means for providing the received data to the media access control entity according to an eight bit nibble at 25 MHz, means for determining a capability mode for a remote station, a first mode being full duplex T2 operation wherein a first two of the four pairs of category 5 wiring providing a 200 Mbps throughput transmit data path and a second two of the four pairs of category 5 wiring providing a 200 Mbps throughput receive data path and a second mode being half duplex T2 operation wherein the four pair of category 5 wiring provide two 100 Mbps throughput channels, configuration means for configuring the data encoding means and the decoding means to the highest throughput capability mode of the remote station and a multi-threaded device driver for controlling the encoding and decoding means to process simultaneous transmission and receipt of data in response to the first mode being configured.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 6 illustrates the Next Page transmit register definitions;

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a 200 Mbps PHY/MAC combination for providing full duplex operation at 400 Mbps.

Figure 1:
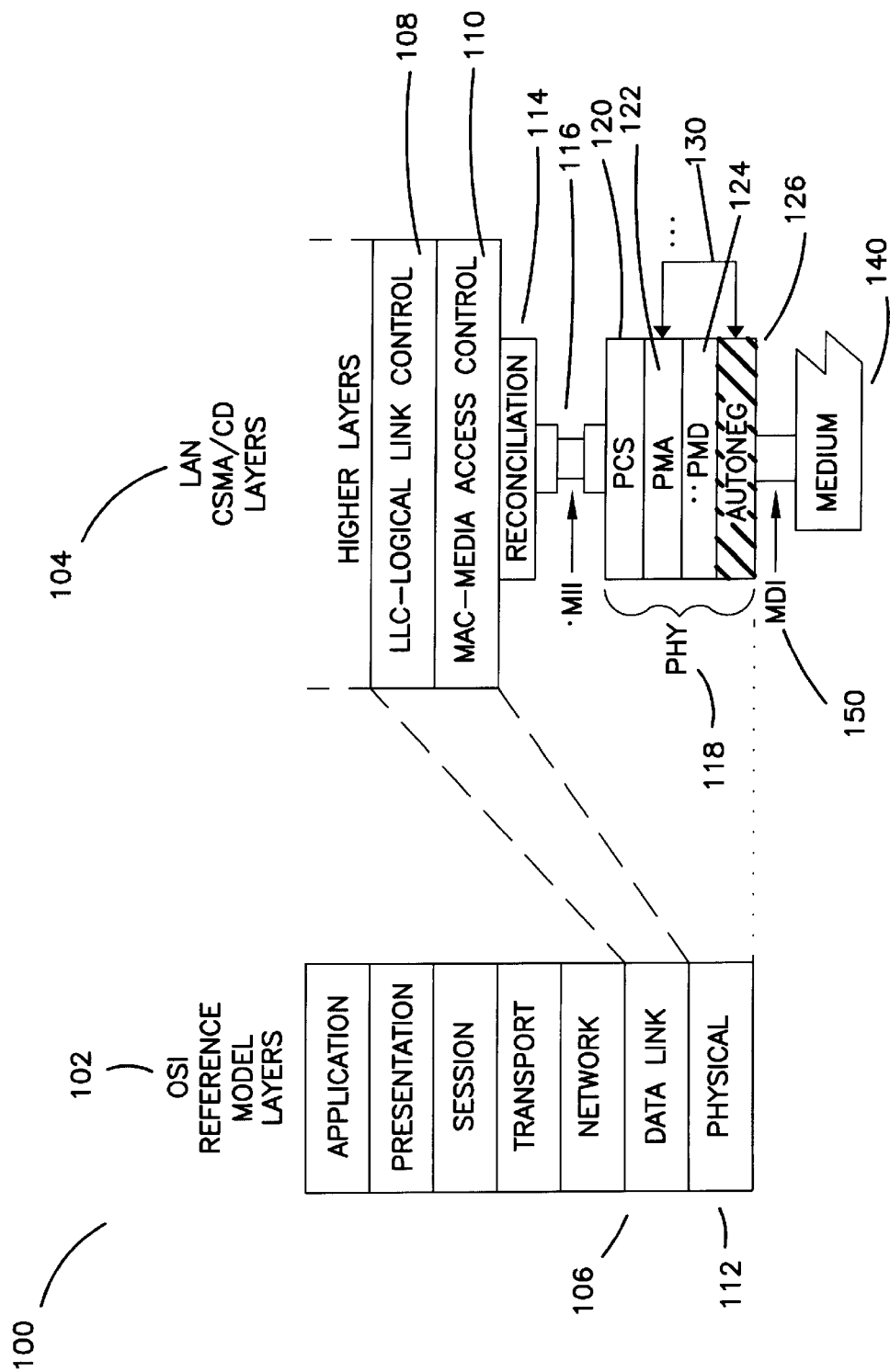
FIG. 1 illustrates a comparison of the OSI reference model to the LAN CSMA/CD layers.

FIG. 1 illustrates a comparison 100 of the OSI reference model 102 to the LAN CSMA/CD layers 104. The data link 106 in the OSI model corresponds to the logical link control (LLC) 108 and the media access control (MAC) 110 in the LAN CSMA/CD layers 104. The physical layer 112 in the OSI model 100 corresponds to the reconciliation layer 114, the medium independent interface 116, and the physical layer device 118.

The physical layer device 118 includes the physical coding 120, the physical medium attachment 122, the physical medium dependent 124, and the auto-negotiation sublayers 126. However, the physical medium dependent sublayer 124 is not specified for 100Base-FX.

The IEEE specification for the physical layer concerns issues such as the physical characteristics of the transmission medium (typically an electrical wire or cable, although fiber optics or wireless transmission is used in some implementations) and the mechanical connection from the station to the transmission medium. This specification addresses physical specifications, including plug dimensions, the number of pins in the plug, and the placement of the pins. Also addressed are electrical issues, such as the voltage levels of the signals that flow on the wire, and functional issues, such as the meaning of a particular voltage level on a given wire.

The physical coding sublayer (PCS) 120 provides services to the Media Access Control sublayer 110. The PCS sublayer 120 in a source station is responsible for encoding the data passed down from the Media Access Control sublayer 110 in a transmitting station. The data encoding function is responsible for translating the bits being transmitted into the proper electrical signals that are then broadcast over the transmission medium.

The PCS sublayer 120 in a destination station is responsible for decoding the signal it receives. The decoding function translates received signals into an appropriate bit stream and passes the resulting data up to the Media Access Control sublayer 110. The PCS sublayer 120 is also responsible for listening to the transmission medium, notifying the Media Access Control sublayer 110 whether the carrier is free or busy, and detecting collisions if applicable.

The physical medium attachment (PMA) sublayer 122 provides services to the PCS sublayer 120. It performs a translation function between the PCS sublayer 120 and the transmission medium 140 and defines the characteristics of a particular type of transmission medium 140. The interface between the Media Access Control sublayer 110 and the PCS sublayer 120 (the PCS-PMA interface) defines the services that a PMA sublayer entity 122 supplies to a PCS sublayer entity 120.

The PCS 120 and PMA 122 sublayers may be implemented in the same device or in separate devices. The interface between the PMA sublayer 122 and the transmission medium 140 (the PMA-Medium interface) is a concrete interface called the Medium Dependent Interface (MDI) 150. The MDI 150 for a particular form of transmission medium defines the characteristics of cable segments (sometimes called the trunk cable), connectors for joining cable segments and connecting cable segments to equipment, and terminators used at the ends of cable segments. Although the transmission medium ordinarily consists of a physical cable, such as coaxial cable, twisted-pair cable, or fiber-optics cable, it can also consist of a microwave link, or other wireless link, in some Ethernet implementations.

Auto-negotiation 126 communicates with the physical medium attachment sublayer 122 through the physical medium attachment service interface 130. Auto-negotiation's 126 flexibility and expandability is provided through the encoding of a 16 bit word. The 16 bit word is referred to as the Link Code Word (LCW). Auto-negotiation 126 and the details of the Link Code Word are discussed in detail later.

The media independent interface 116 provides an interconnection between the Media Access Control sublayer and the Physical Layer entities (Physical layer device). The Media independent interface supports both 10 Mbps and 100 Mbps data rates through four bit wide (nibble wide) transmit and receive paths.

The Medium Independent Interface bus must be expanded to 8 bits in both the receive and transmit directions to support the 400 Mbps full duplex operation, i.e., 8 bits at 25 MHz in both the receive and transmit modes.

The Reconciliation sublayer 114 provides a mapping between the signal provided at the Media Independent Interface 118 and the Media Access Control 110/Physical layer 118 signaling service definition.

Figure 2:
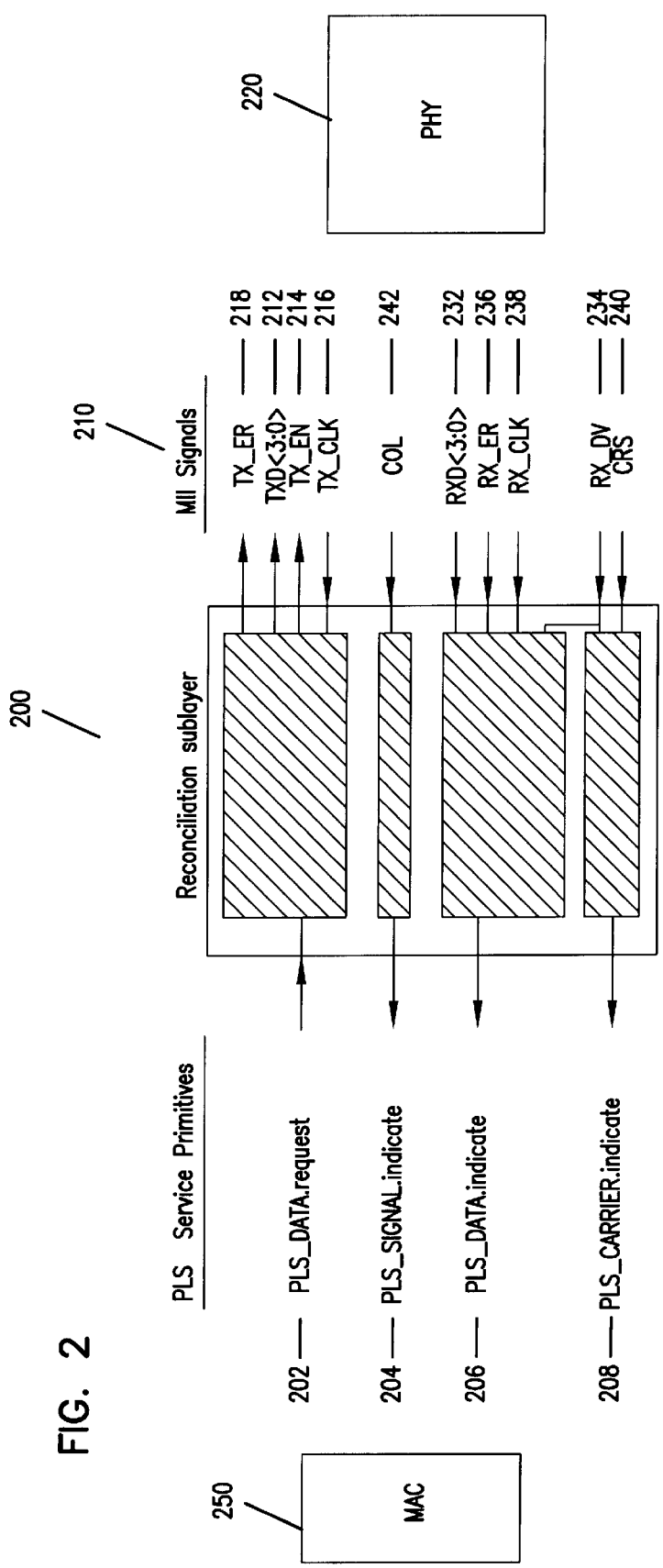
FIG. 2 illustrates the inputs and outputs between the Media Access Control/Physical layer signaling services for the Reconciliation layer.

FIG. 2 illustrates the inputs and outputs between the Media Access Control/Physical layer signaling services for the Reconciliation layer 200. Those skilled in the art will readily recognize that the insuring description, for purposes of completion, assumes that full duplex mode has not been selected. Thus, the collision signalling would not be necessary in full duplex mode.

The Reconciliation layer 200 maps the PLS_DATA.request 202 to the Media Independent Interface signals 210 including transmit data (TXD<7:0>) 212, transmit enable (TX_EN) 214 and transmit clock (TX_CLK) 216 sourced by the physical layer device 220. Synchronization between the Reconciliation sublayer 200 and the physical layer device 220 is achieved via the transmit clock 216. While the physical layer device 220 generates the transmit clock 216, the transmit data 212 and transmit enable 214 signals are generated by the reconciliation sublayer 200.

PLS_DATA.indicate 204 is mapped to the receive data (RXD<7:0>) 232, received data valid (RX_DV) 234, receive data error (RX_ER) 236, and receive clock (RX_CLK) 238. The value of the data transferred to the Media Access Control sublayer 250 is controlled by the RX_ER signal 236. Synchronization between the Physical layer device 220 and the Reconciliation sublayer 200 is achieved using the receive clock signal 238.

The PLS_DATA.indicate primitive 206 is generated to all Media Access Control 250 sublayer entities in the network after a PLS_DATA.request 202 is issued. Each nibble of data transferred on RXD<7:0> 232 results in the generation of eight PLS_DATA.indicate transactions 206.

The PLS_CARRIER.indicate primitive 208 is mapped to Media Independent Interface signals CRS 240 and RX_DV 234. The PLS_CARRIER.indicate primitive 208 is used to indicate the carrier status parameter. The PLS_CARRIER.indicate service primitive 208 is generated by the reconciliation sublayer 200 whenever the status of the carrier parameter changes.

The PLS_SIGNAL.indicate primitive 204 is mapped to the Media Independent Interface collision signal (COL) 242. The PLS_SIGNAL.indicate service primitive 204 is generated whenever the signal status makes a transition from an error condition to no error condition or vice versa. If, during frame reception, both RX_DV 234 and RX_ER 236 are asserted, the Reconciliation sublayer 200 ensures that the Media Access Control 250 will detect a FRAME CHECK ERROR in that frame.

If, during the process of transmitting a frame, it is necessary to request that the Physical layer device 220 deliberately corrupt the contents of the frame in such a manner that a receiver will detect the corruption with the highest degree of probability, then the signal TX_ER 218 maybe generated. For example, a repeater that detects an RX_ER 236 during frame reception on an input port may propagate that error indication to its output ports by asserting TX_ER 218 during the process of transmitting that frame. Since there is no mechanism in the definition of the Media Access Control sublayer 250 by which the transmit data stream can be deliberately corrupted, the Reconciliation sublayer 200 is not required to generate TX_ER 218.

TX_CLK (Transmit Clock) 216 is a continuous clock that provides the timing reference for the transfer of the TX_EN 214, TXD 212, and TX_ER 218 signals from the Reconciliation sublayer 200 to the Physical layer device 220. TX_CLK 216 is sourced by the Physical layer device 220. The TX_CLK 216 frequency must be 25% of the nominal transmit date rate ±100 ppm. For example, a Physical layer device 220 operating at 100 Mb/s must provide a TX_CLK 216 having a frequency of 25 MHz, and a Physical layer device 220 operating at 10 Mb/s must provide a TX_CLK 216 having frequency of 2.5 MHz. The duty cycle of the TX_CLK signal 216 is between 35% and 65% inclusive.

RX_CLK 238 is a continuous clock that provides the timing reference for the transfer of the RX_DV 234, RXD 232, and RX_ER 236 signals from Physical layer device 220 to the Reconciliation sublayer 200. RX_CLK 238 is also sourced by the Physical layer device 220. The Physical layer device 220 may recover the RX_CLK 238 reference from the received data or it may derive the RX_CLK 238 from a nominal clock (e.g., the TX_CLK 216 reference). The minimum high and low times of RX_CLK 238 is 35% of the nominal period under all conditions. While RX_DV 234 is asserted, RX_CLK 238 must be synchronous with the recovered data, have a frequency equal to 25% of the data rate of the received signal, and have a duty cycle of between 35% and 65% inclusive. When the signal received from the medium is continuous and the Physical layer device 220 can recover the RX_CLK 238 reference and supply the RX_CLK 238 on a continuous basis, there is no need to transition between the recovered clock reference and a nominal clock reference on a frame-by-frame basis. If loss of received signal from the medium causes a Physical layer device 220 to lose the recovered RX_CLK 238 reference, the Physical layer device 220 sources the RX_CLK 238 from a nominal clock reference.

Transitions from nominal clock to recovered clock or from recovered clock to nominal clock is made only while RX_DV 234 is de-asserted. During the interval between the assertion of CRS 240 and the assertion of RX_DV 234 at the beginning of a frame, the Physical layer device 220 may extend a cycle of RX_CLK 238 by holding it in either the high or low condition until the Physical layer device 220 has successfully locked onto the recovered clock. Following the de-assertion of RX_DV 234 at the end of a frame, the Physical layer device 220 may extend a cycle of RX_CLK 238 by holding it in either the high or low condition for an interval not exceeding twice the nominal clock period.

TX_EN 214 indicates that the Reconciliation sublayer 200 is presenting nibbles on the Media Independent Interface 210 for transmission. TX_EN is asserted by the Reconciliation sublayer 200 synchronously with the first nibble of the preamble and shall remain asserted while all nibbles to be transmitted are presented to the Media Independent Interface. TX_EN 214 is negated prior to the first TX_CLK 216 following the final nibble of a frame. TX_EN 214 is driven by the Reconciliation sublayer 200 and transitions synchronously with respect to the TX_CLK 216.

TXD 212 is a bundle of 8 data signals (TXD<7:0>) that are driven by the Reconciliation sublayer 200. TXD<7:0> 212 transitions synchronously with respect to the TX_CLK 216. For each TX_CLK 216 period in which TX_EN 214 is asserted, TXD<7:0> 212 are accepted for transmission by the Physical layer device 220. TXD<0> is the least significant bit of TXD 212. While TX_EN 214 is de-asserted, TXD<7:0> 212 has no effect upon the Physical layer device 220.

TX_ER 218 transitions synchronously with respect to the TX_CLK 216. When TX_ER 218 is asserted for one or more TX_CLK 216 periods while TX_EN 214 is also asserted, the Physical layer device 220 emits one or more symbols that are not part of the valid data or delimiter set somewhere in the frame being transmitted. The relative position of the error within the frame is not necessarily preserved. Assertion of the TX_ER 218 signal does not effect the transmission of data when a Physical layer device 220 is operating at 10 Mb/s, or when TX_EN 214 is de-asserted. The TX_ER 218 is implemented at the Media Independent Interface of a Physical layer device, at the Media Independent Interface of a repeater that provides an Media Independent Interface port, and in Media Access Control sublayer devices. If a Reconciliation sublayer 200 or a repeater with an Media Independent Interface port does not actively drive the TX_ER signal 218, the Reconciliation sublayer 200 ensures that the TX_ER signal 218 is pulled down to an inactive state at all times.

RX_DV (Receive Data Valid) 234 is driven by the Physical layer device 220 to indicate that the Physical layer device 220 is presenting recovered and decoded nibbles on the RXD<7:0> 232 bundle and that the data on RXD<7:0> 232 is synchronous to RX_CLK 238. RX_DV 234 transitions synchronously with respect to the RX_CLK 238. RX_DV 234 remains asserted continuously from the first recovered nibble of the frame through the final recovered nibble and is negated prior to the first RX_CLK 238 that follows the final nibble. In order for a received frame to be correctly interpreted by the Reconciliation sublayer 220 and the Media Access Control sublayer 250, RX_DV 234 must encompass the frame, starting no later than the Start Frame Delimiter (SFD) and excluding any End-of Frame delimiter.

RXD 232 is a bundle of eight data signals (RXD<7:0>) that transition synchronously with respect to the RX_CLK 238. RXD<7:0> 232 are driven by the Physical layer device 220. For each RX_CLK 238 period in which RX_DV 234 is asserted, RXD<7:0> 232 transfer four bits of recovered data from the Physical layer device 220 to the Reconciliation sublayer 200. RXD<0> is the least significant bit. While RX_DV 234 is de-asserted, RXD<7:0> 232 has no effect on the Reconciliation sublayer 200.

While RX_DV 234 is de-asserted, the Physical layer device 220 provides a False Carrier indication. In order for a frame to be correctly interpreted by the Media Access Control sublayer 250, a completely formed SFD must be passed across the Media Independent Interface. A Physical layer device 220 is not required to loop data transmitted on TXD<7:0> 212 back RXD<7:0> 232 unless the loopback mode of operation is selected.

RX_ER (Receive Error) 236 is driven by the Physical layer device 220. RX_ER 236 is asserted for one or more RX_CLK 238 periods to indicate to the Reconciliation sublayer 200 that an error (e.g., a coding error, or any error that the Physical layer device 220 is capable of detecting, and that may otherwise be undetectable at the Media Access Control sublayer 250) was detected somewhere in the frame presently being transferred from the Physical layer device 220 to the Reconciliation sublayer 200. RX_ER 236 transitions synchronously with respect to RX_CLK 238. While RX_DV 234 is de-asserted, RX_ER 236 has no effect on the Reconciliation sublayer 200.

CRS 240 is asserted by the Physical layer device 220 when either the transmit or receive medium is not idle. CRS 240 is de-asserted by the Physical layer device 220 when both the transmit and receive media are idle. The Physical layer device 220 ensures that CRS 240 remains asserted throughout the duration of a collision condition. CRS 240 is not required to transition synchronously with respect to either the TX_CLK 216 or the RX_CLK 238. The behavior of the CRS signal 240 is unspecified when the full duplex mode is selected, or when the Auto-Negotiation process selects full duplex mode of operation.

COL 242 is asserted by the Physical layer device 220 upon detection of a collision on the medium, and remains asserted while the collision condition persists. COL 242 is not required to transition synchronously with respect to either the TX_CLK 216 or the RX_CLK 238. The behavior of the COL signal 242 is unspecified when the full duplex mode is selected, or when the Auto-Negotiation process selects a full-duplex mode of operation. Since full duplex does not share the signal channel with multiple stations, there is no need to adhere to the original Ethernet medium access control system.

Figure 3:
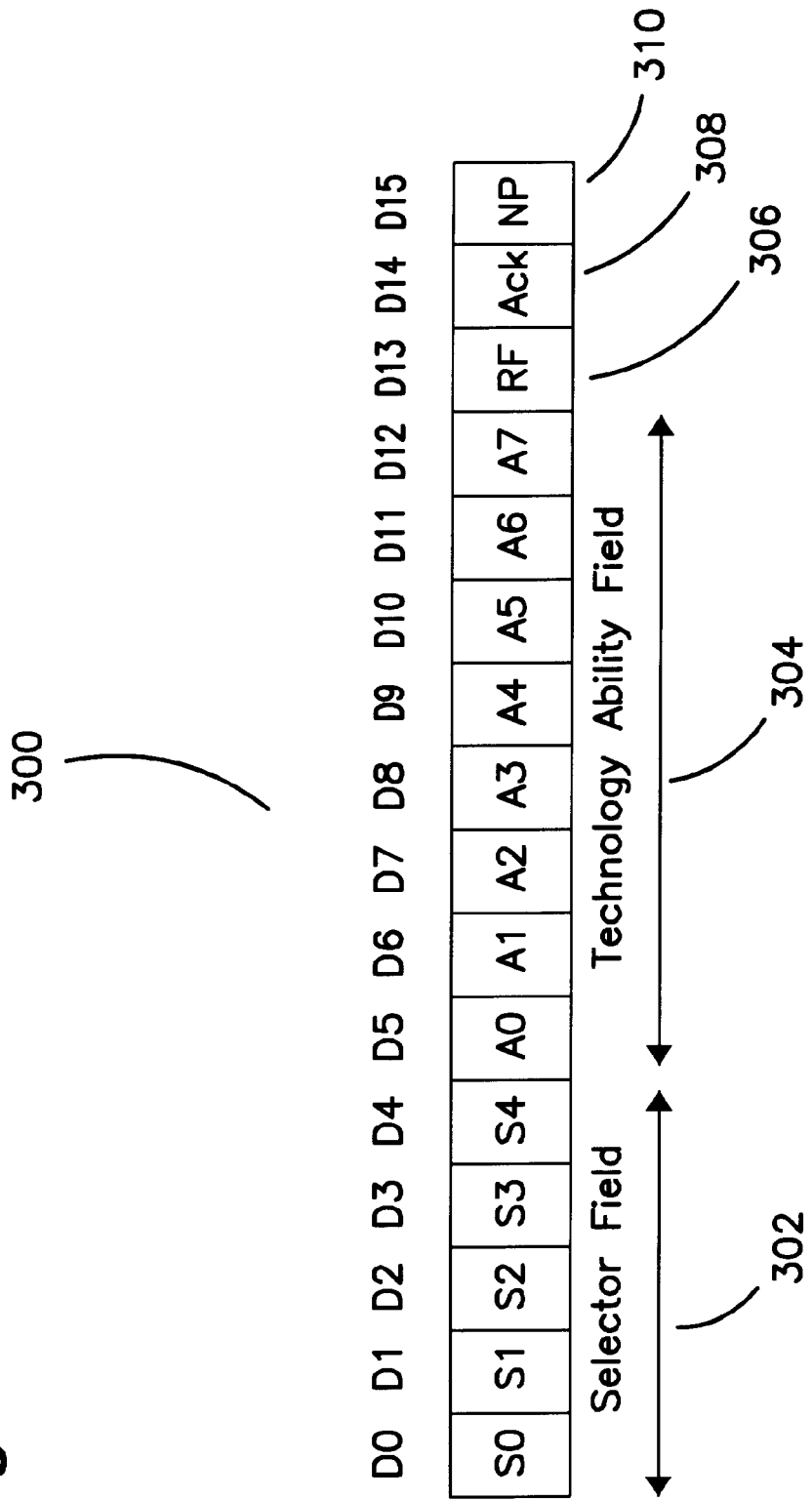
FIG. 3 illustrates the Link Code Word used during the auto-negotiation process.

Auto-negotiation is provided through the exchange of Base and Next pages between two network stations. FIG. 3 illustrates the Link Code Word 300 used during the auto-negotiation process. The selector field 302 allows 32 different definitions of the technology ability field 304 to coexist. The intention is to allow standard technologies to leverage the basic auto-negotiation mechanism. Currently, selector field 302 with a value of 00001 is assigned to IEEE 802.3 and selector field 302 with a value of 00010 is assigned to IEEE 802.9. Two more selector field 302 codes are reserved for expansion of auto-negotiation. The remaining selector field 302 codes are reserved to be assigned to standard technologies that wish to leverage this mechanism, yet fall outside the scope of the currently defined value of the selector field 302.

The technology ability field 304 is defined relative to the value of selector field 302 of the Link Code Word 300. Priority resolution works such that when the 3 remaining bits in the technology ability field 304 are eventually defined, the new technology can be inserted anywhere in the list without disturbing the existing hierarchy. This means that the 3 reserved bits can be assigned without causing interoperability problems with any auto-negotiation device produced before these bits were defined.

The Remote Fault bit 306, RF, allows transmission of simple fault information to the Link Partner. The Acknowledge bit 308, Ack, is used by the synchronization mechanism to ensure robust data transfer. The Next Page bit 310, NP, advertises to the Link Partner whether the Next Page function is supported. The Next Page function is used to send additional information beyond the basic configuration information. Both ends must have Next Page ability in order to exchange this type of information.

Figure 4:
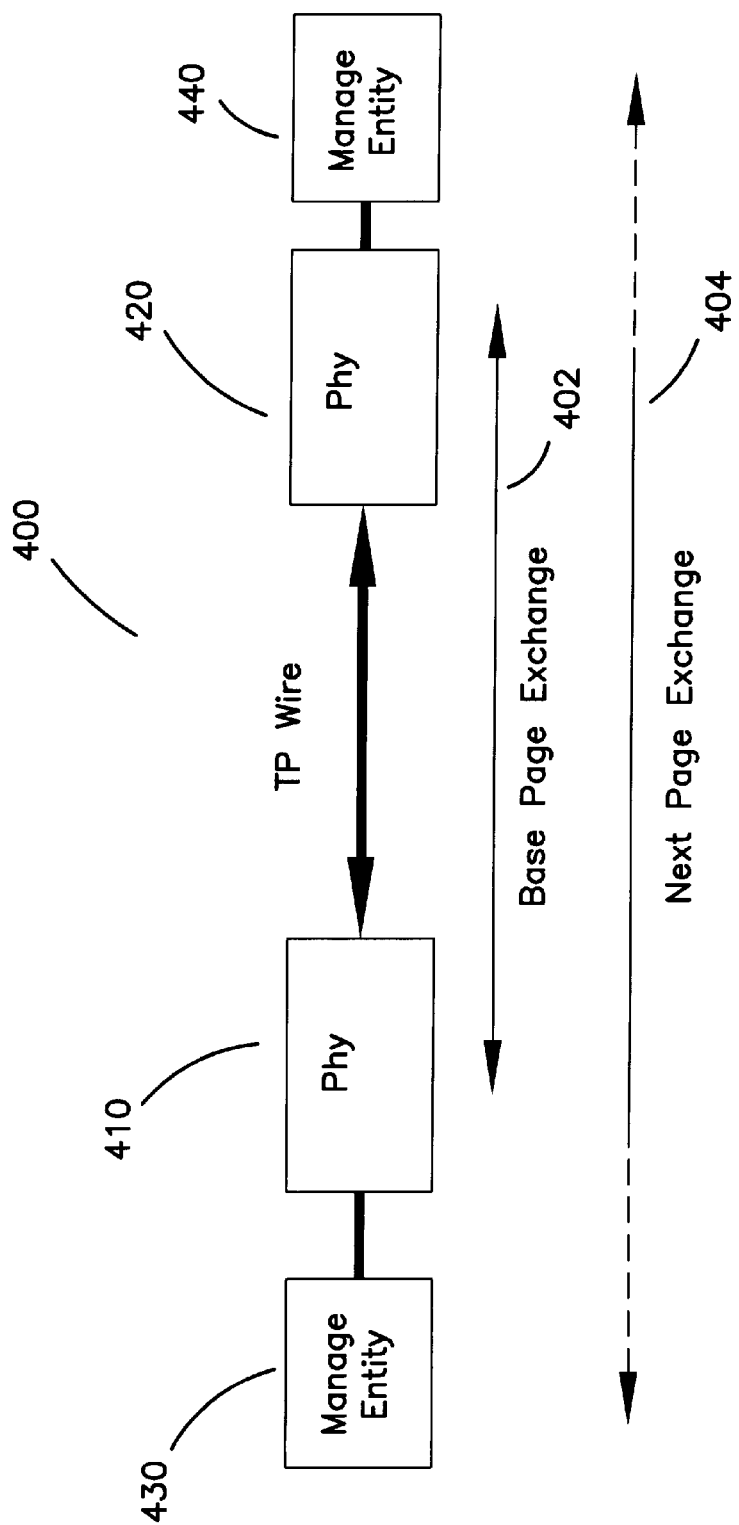
FIG. 4 is a block diagram illustrating Base Page and Next Page auto-negotiation between a local physical layer device and a remote physical layer device.

FIG. 4 is a block diagram 400 illustrating Base Page 402 and Next Page 404 auto-negotiation between a local physical layer device 410 and a remote physical layer device 420. The Next Page function 404 uses the standard auto-negotiation mechanisms to exchange data. This data is carried by the optional Next Pages of information, which follow the transmission and acknowledgment procedures used for the base Link Code Word 300 as illustrated with reference to FIG. 3.

In FIG. 4, both physical layer devices 410, 420 exchange base pages 402. The local management entity 430 then writes a Next Page 404 to a Next Page register (not shown). The Next Page 404 then may be transmitted to the remote physical layer device 420. The remote physical layer device 420 then puts the received Next Page 404 into a register (not shown) which is then read by a management entity 440 of the remote physical layer device 420. This occurs both ways until all Next Pages are sent. Each physical layer device 410, 420 may be implemented with management capability in order to provide Next Page capability.

As discussed with reference to FIG. 4, Next Page 404 exchange occurs after the base Link Code Words 402 have been exchanged. Next Page 404 exchange includes the normal auto-negotiation arbitration process to send Next Page messages 404. Two message encodings are defined to control the Next Page functionality. These are Message Pages and Unformatted Pages.

Figure 5A:
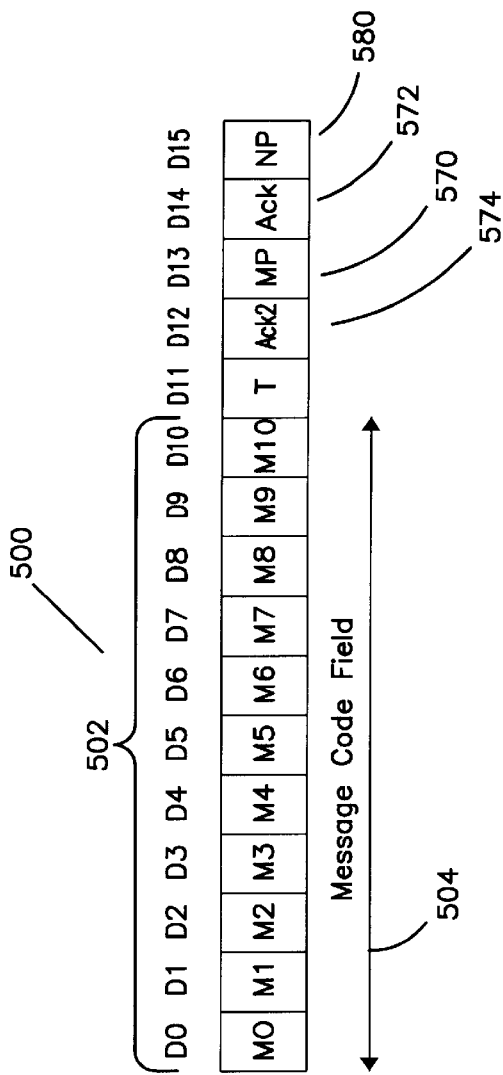
FIGS. 5a and b illustrate the Message Page encoding and Unformatted Page encoding.
Figure 5B:
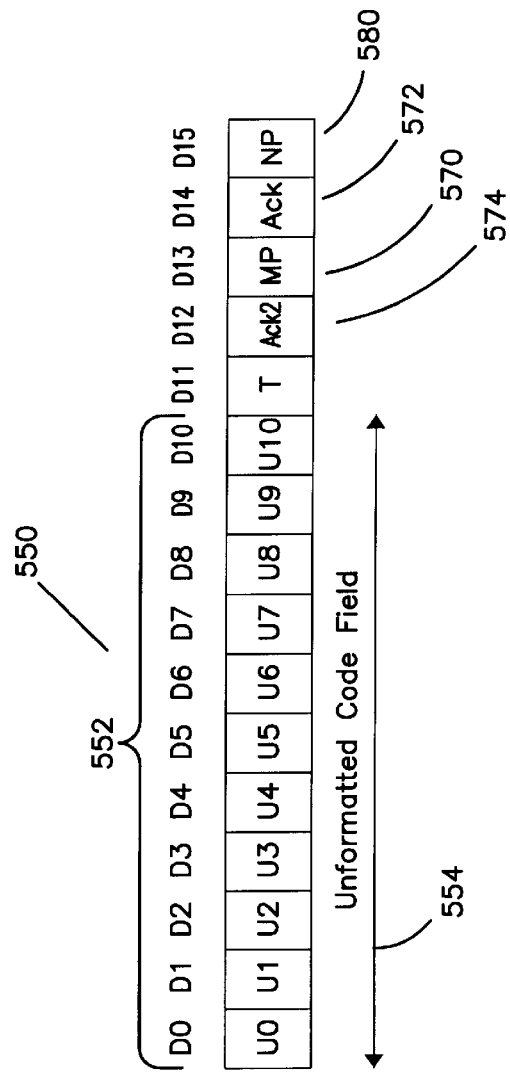

FIGS. 5a and b illustrate the Message Page encoding 500 and Unformatted Page encoding 550. The Message Page encoding 550 and Unformatted Page encoding 550 differ in their eleven bit field D0–D10 502, 552. The Message Page encoding 500 includes a Message Code Field 504, which is an eleven bit wide field for encoding 2048 possible messages that are predefined in annex 28C of IEEE Standard 802.3u. Unformatted Page encoding 550 provides an unformatted code field 554 of eleven bits, which may contain an arbitrary value which may correspond to a vendor specific setup. According to the present invention, the 400 Mbps full duplex operation is advertised through these Unformatted Next Page functions.

Whether the page is a Message Page 500 or an Unformatted Page 550 is determined by the setting of the Message Page bit (MP) 570. If MP 570 is set high, the page is a Message Page 500. IEEE Standard 802.3u also defines a dual acknowledgment system. Acknowledge (Ack) 572 is used to declare receipt of the information. Acknowledge 2 (Ack2) 574 is used to indicate that the receiver is able to act on the information or perform the requested task defined in the message.

The Next Page operation is controlled by control bits Next Page 580 and Acknowledge 572, which are used in the base Link Code Word. Setting NP 580 high in the base Link Code Word indicates that the device is Next Page able. If both a device and its Link Partner are Next Page able, then Next Page exchange may occur. If one or both devices are not Next Page able, then Next Page exchange will not occur. Thus, after the base Link Code Words have been exchanged, the FLP LINK GOOD CHECK state will be entered. The toggle bit 590 is used to ensure proper synchronization between the Local Device and the Link Partner during the Next Page exchange. The Toggle bit 590 always takes the opposite value of the Toggle bit 590 in the previously exchanged Link Code Word. The initial value of the Toggle bit 590 in the first Next Page transmitted is the inverse of bit eleven in the base Link Code Word.

Referring again to the Acknowledge 2 bit 574, if the device can comply with the message, the Acknowledge 2 bit 574 is set high.

As discussed above, the Message Pages 500 contain predefined eleven bit codes, whereas the Unformatted Pages 550 are used to send extended messages. If the selector field values do not match, then each series of Unformatted Pages 550 must be preceded by a Message Page 500 containing a message code that defines how the following Unformatted Pages 550 will be interpreted. If the selector field values match, then the convention governing the use of Message Pages 500 shall be defined by the selector field value definition. Any number of Next Pages may be sent in any order. However, the total number of Next Pages sent should be kept small to minimize the link startup time.

Next Page transmission ends when both ends of a link segment set their Next Page bits 580 to logic zero. This indicates that neither has anything additional to transmit. It is possible for one device to have more pages to transmit than the other device. Thus, once a device has completed transmitting its Next Page information, that device will transmit Message Pages with Null message codes 504 and the NP bit 580 set low. Meanwhile, the Link Partner may continue to transmit valid Next Pages. Auto-negotiation able devices recognize reception of Message Pages 500 with Null message codes 504 as the end of its Link Partner's Next Page information.

FIG. 6 illustrates the Next Page transmit register definitions 600. An auto-negotiation Next Page transmit register 600 is used to store the Next Page Link Code Word to be transmitted next. On power-up, this register 600 contains the default value of 2001H, which represents a Message Page with the Message Code set to Null Message. The initial value in the register 600 is replaced by any valid Next Page Message Code that the device wishes to transmit. Other registers (not shown) are used to advertise the ability of the physical layer device and the advertised ability of the Link Partner. Finally, a register is provided to indicate fault detection, Link Partner Next Page ability, Local device Next Page ability, page receipt and Link Partner auto-negotiation ability.

The bit 15 602 is for the Next Page 604. Bit 15 602 being set to logic zero indicates the last page, and when set to logic one indicates additional Next Page(s) will follow 606. Bit 14 612 is reserved 614 to Acknowledge receipt of information. Thus, bit 14 612 is written as logic zero and is ignored on read 616. Bit 13 622 is for the Message Page 624. Bit 13 622 being set to logic zero indicates an unformatted page, and when set to logic one indicates a message page 626. Bit 12 632 is for Acknowledge 2 634. Bit 12 632 being set to logic zero indicates that the device cannot comply wit the message, and when set to logic one indicates that the device can comply with the message 636. Bit 11 642 is for Toggle 644. Bit 11 642 being set to logic zero indicates that the previous value of the transmitted Link Code Word equaled logic one, and when set to logic one indicates that the previous value of the transmitted Link Code Word equaled logic zero 646. Finally, bits 10-0 652 are for the code fields 654.

Figure 7:
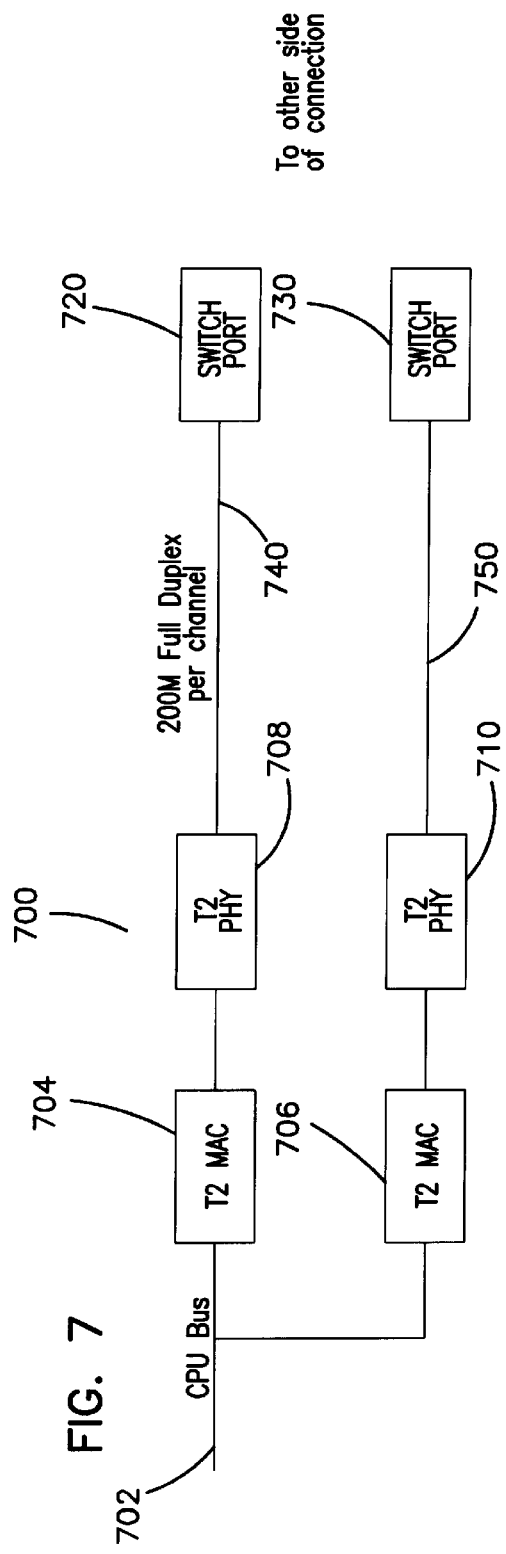
FIG. 7 illustrates a 200 Mbps full duplex per channel system.

FIG. 7 illustrates a 200 Mbps full duplex per channel system 700. A CPU bus 702 is connected a T2 Media Access Control entity 704, 706 for each channel. Each T2 Media Access Control entity 704, 706 is then coupled to a T2 Physical layer device 708, 710. Each T2 Physical layer device 708, 710 is coupled to a switch port 720, 730 via two pair of UTP category 5 cables 740, 750. At full duplex, one pair of the UTP wiring within each pair of UTP category 5 cables 740, 750 provides a path for transmitting data, while the second of the pair 740, 750 provides a path for receiving data. According to the standard, the Medium Independent Interface (assumed to be included in the T2 PHY) interfacing the T2 Media Access Control entity 704, 706 to the T2 Physical layer device 708, 710 provides four bits of data per nibble. At 25 MHz, each pair provides a throughput of 100 Mbps (one for transmitting and one receiving). However, while T2 allows all 4 pairs of wire to be used, two separate channels must be provided. Therefore, two different Physical layer devices (PHYs) 708, 710 and 2 different Media Access Control entities (MACs) 704, 706 are required.

Figure 8:
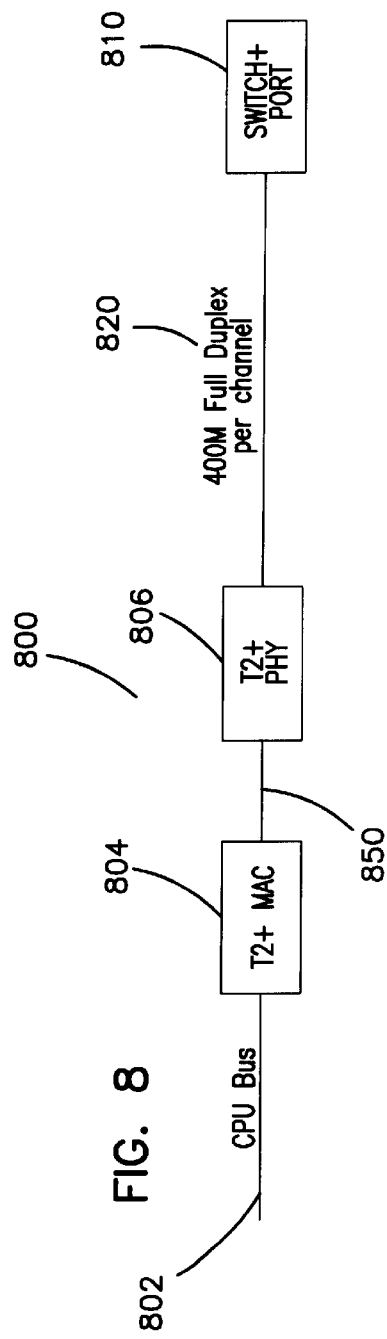
FIG. 8 illustrates a 400 Mbps full duplex system according to the present invention.

FIG. 8 illustrates a 400 Mbps full duplex system 800 according to the present invention. The CPU bus 802 is connected to a 200 Mbps T2 Media Access Control entity 804. The 200 Mbps T2 Media Access Control entity 804 is coupled to a 200 Mbps T2 Physical layer device 806. Then, the 200 Mbps T2 Physical layer device 806 is coupled to a switch port 810 via four pair of UTP category 5 cables 820. Accordingly, a 200 Mbit/sec PHY/MAC combination 800 is provided that uses all 4 pairs of Category 5 wiring to create twice the bandwidth on a link. In full duplex mode this allows a 400 Mbit/sec transfer rate.

The system maintains the auto-negotiation functions to provide backwards compatibility with the current 2 pair 100Base-T2 standard. The auto-negotiation mechanism simply decides whether both ends of the link are capable of the 4 pair operation, and automatically switches to it if applicable.

The Medium Independent Interface bus 850 must be expanded to 8 bits in both the receive and transmit directions to support the 400 Mbps full duplex operation, i.e., 8 bits at 25 MHz in both the receive and transmit modes. Thus, the PHY/MAC combination 804, 806 utilizes all 4 pairs of wiring 820 to create a single interface link.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A 400 Mbps T2 segment, comprising:
   one T2 physical layer device providing a transmit and receive port connected to a first end of four pairs of category 5 wiring;
   one media access control entity for sourcing physical layer signaling (PLS) primitives to manage the flow of frames eight bits a nibble to and from the four pairs of category 5 wiring;

a medium independent interface, coupling the media access control entity and the T2 physical layer device, the medium independent interface including:
   means for providing an eight bit wide transmit data path from the media access control entity to the T2 physical layer device;
   means for providing an eight bit wide receive data path from the physical layer device to the media access control entity; and
   means for mapping PLS primitives from the media access control entity to the eight bit wide transmit and receive data paths; and
one switch, coupled at the second end of the four pairs of category 5 wiring, the switch having a port for accepting the four pairs of category 5 wiring, the port having a selection capability for trunking the four pair of category 5 wiring into a single channel comprising separate 200 Mbps throughput transmit and receive data paths to the physical layer device.

2. The 400 Mbps T2 segment of claim 1 wherein the eight bit wide transmit and receive data paths of the media independent interface are clocked at 25 MHz, each providing a 200 Mbps data path between the medium access control layer and the physical layer device.

3. The 400 Mbps T2 segment of claim 1 wherein the medium access control entity further comprises:
   means for encapsulating transmit data into frames and passing the frames to the media independent interface; and
   means for filtering data received from the media independent interface and decapsulating the receive data addressed to the media access control entity.

4. A 400 Mbps T2 segment of claim 1 wherein the physical layer device further comprises:
   transmit data means for receiving data from the media access control entity according to an eight bit nibble at 25 MHz;
   data encoding means, coupled to the transmit data means, for converting transmit data to electrical signals for transmission over the four pair of category 5 wiring according to a first mode or a second mode;
   data decoding means, coupled to the four pair of category 5 wiring, for converting electrical signals received over the four pair of category 5 wiring to received data according to a first mode or a second mode;
   processing means, coupled to the data decoding means, for providing the received data to the media access control entity according to an eight bit nibble at 25 MHz;
   means for determining a capability mode for a remote station, a first mode being full duplex T2 operation wherein a first two of the four pairs of category 5 wiring providing a 200 Mbps throughput transmit data path and a second two of the four pairs of category 5 wiring providing a 200 Mbps throughput receive data path and a second mode being half duplex T2 operation wherein the four pair of category 5 wiring provide two 100 Mbps throughput channels;
   configuration means for configuring the data encoding means and the decoding means to the highest throughput capability mode of the remote station; and
   a multi-threaded device driver for controlling the encoding and decoding means to process simultaneous transmission and receipt of data in response to the first mode being configured.

5. A 200 Mbps T2 Physical layer device, comprising:
   connection means to four pairs of category 5 wiring for transmitting and receiving electrical signals;
   transmit data means for receiving data from one media access control entity according to an eight bit nibble at 25 MHz;
   data encoding means, coupled to the transmit data means, for converting transmit data to electrical signals for transmission over the four pair of category 5 wiring according to a first mode or a second mode;
   data decoding means, coupled to the four pair of category 5 wiring, for converting electrical signals to received data, the electrical signals being received over the four pair of category 5 wiring according to a first mode or a second mode;
   processing means, coupled to the data decoding means, for providing the received data to the media access control entity according to an eight bit nibble at 25 MHz;
   means for determining a capability mode for a remote station, a first mode being full duplex T2 operation wherein a first two of the four pairs of category 5 wiring providing a 200 Mbps throughput transmit data path and a second two of the four pairs of category 5 wiring providing a 200 Mbps throughput receive data path and a second mode being half duplex T2 operation wherein the four pair of category 5 wiring provide two 100 Mbps throughput channels;
   configuration means for configuring the data encoding means and the decoding means to the highest throughput capability mode of the remote station; and
   a multi-threaded device driver for controlling the encoding and decoding means to process simultaneous transmission and receipt of data in response to the first mode being configured.

6. A method of providing a 400 Mbps full duplex T2 segment, comprising the steps of:
   expanding a transmit data path and a receive data path of a medium independent interface from four bits to eight bits to provide eight bit wide transmit and receive nibbles between one physical layer device and one media access control entity;
   forming a transmit path between the physical layer device and a switch port comprising a first two of four pairs of category 5 wiring;
   forming a receive path between the physical layer device and the switch port comprising a second two of the four pairs of category 5 wiring; and
   processing the eight bit wide transmit and receive nibbles between the medium independent interface and the physical layer device at 25 MHz.

7. A 400 Mbps T2 segment, comprising:
   one T2 physical layer device providing a transmit and receive port connected to a first end of four pairs of category 5 wiring;
   one media access control entity for sourcing physical layer signaling (PLS) primitives to manage the flow of frames eight bits a nibble to and from the four pairs of category 5 wiring;
   a medium independent interface, coupling the media access control entity and the T2 physical layer device, the medium independent interface including:
      means for providing an eight bit wide transmit data path from the media access control entity to the T2 physical layer device;

means for providing an eight bit wide receive data path from the physical layer device to the media access control entity; and means for mapping PLS primitives from the media access control entity to the eight bit wide transmit and receive data paths; and one switch, coupled at the second end of the four pairs of category 5 wiring, the switch having a port for accepting the four pairs of category 5 wiring, the port having a selection capability for trunking the four pair of category 5 wiring into a single channel comprising separate 200 Mbps throughput transmit and receive data paths to the physical layer device or into two channels comprising separate 100 Mbps throughput transmit and receive data paths to the physical layer device.

8. A method of providing a 400 Mbps full duplex T2 segment, comprising the steps of:

expanding a transmit data path and a receive data path of a medium independent interface from four bits to eight bits to provide eight bit wide transmit and receive nibbles between one physical layer device and one media access control entity;

forming a transmit path between the physical layer device and a switch port comprising a first two of four pairs of category 5 wiring;

forming a receive path between the physical layer device and the switch port comprising a second two of the four pairs of category 5 wiring;

processing the eight bit wide transmit and receive nibbles between the medium independent interface and the physical layer device at 25 MHz; and switching to trunk the four pair of category 5 wiring, selectively, into a single channel comprising separate 200 Mbps throughput transmit and data paths to the physical layer device, or into two channels comprising separate 100 Mbps throughput transmit and receive data paths to the physical layer device.

* * * * *